(12) United States Patent
Kapitza et al.

(10) Patent No.: US 10,960,853 B2
(45) Date of Patent: Mar. 30, 2021

(54) WIPER MOTOR AND METHOD FOR THE PRODUCTION OF A WIPER MOTOR

(71) Applicant: Valeo Systèmes d'Essuyage, Le Mesnil Saint Denis (FR)

(72) Inventors: Harald Kapitza, Bietigheim-Bissingen (DE); Siegfried Stefani, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 260 days.

(21) Appl. No.: 16/062,508

(22) PCT Filed: Dec. 16, 2016

(86) PCT No.: PCT/EP2016/081402
§ 371 (c)(1),
(2) Date: Jun. 14, 2018

(87) PCT Pub. No.: WO2017/103089
PCT Pub. Date: Jun. 22, 2017

(65) Prior Publication Data
US 2018/0370493 A1 Dec. 27, 2018

(30) Foreign Application Priority Data
Dec. 17, 2015 (DE) .................. 10 2015 122 094.6

(51) Int. Cl.
*B60S 1/34* (2006.01)
*B60S 1/16* (2006.01)
*F16C 23/02* (2006.01)

(52) U.S. Cl.
CPC ............ *B60S 1/3493* (2013.01); *B60S 1/166* (2013.01); *F16C 23/02* (2013.01); *B60S 1/3495* (2013.01); *F16C 2326/09* (2013.01)

(58) Field of Classification Search
CPC ......... F16H 57/021; F16H 2057/02034; B60N 2/0232; F16C 2326/09
See application file for complete search history.

(56) References Cited

U.S. PATENT DOCUMENTS 5,634,726 A * 6/1997 Edele ............... B29C 45/14491
384/276
5,844,382 A 12/1998 Dan
(Continued)

FOREIGN PATENT DOCUMENTS

| CN | 103221272 A | 7/2013 |
| CN | 104228771 A | 12/2014 |

(Continued)

OTHER PUBLICATIONS

Machine Translation of DE 102010052776, obtained Jul. 24, 2020.*
(Continued)

*Primary Examiner* — Richard W Ridley
*Assistant Examiner* — Brian J McGovern
(74) *Attorney, Agent, or Firm* — Osha Bergman Watanabe & Burton

(57) ABSTRACT

The invention relates to a wiper motor (10) with a shaft (30) for driving a wiper arm (1), wherein the shaft (30) projects through an opening (31) of a housing (15) and in the region of the opening (31) is mounted radially in a bore (55) of at least one substantially sleeve-shaped element (40), and wherein the sleeve-shaped element (40) is fixed at least axially in the region of the housing (15). According to the invention, it is provided that the sleeve-shaped element (40) has at least two different cross-sections (41, 42), a first cross-section (41) which is designed to protrude axially through the opening (31) and a second cross-section (42) which is designed to be accommodated in an axially fixed manner within said opening (31).

12 Claims, 4 Drawing Sheets

(56) References Cited

U.S. PATENT DOCUMENTS

Figure 1:
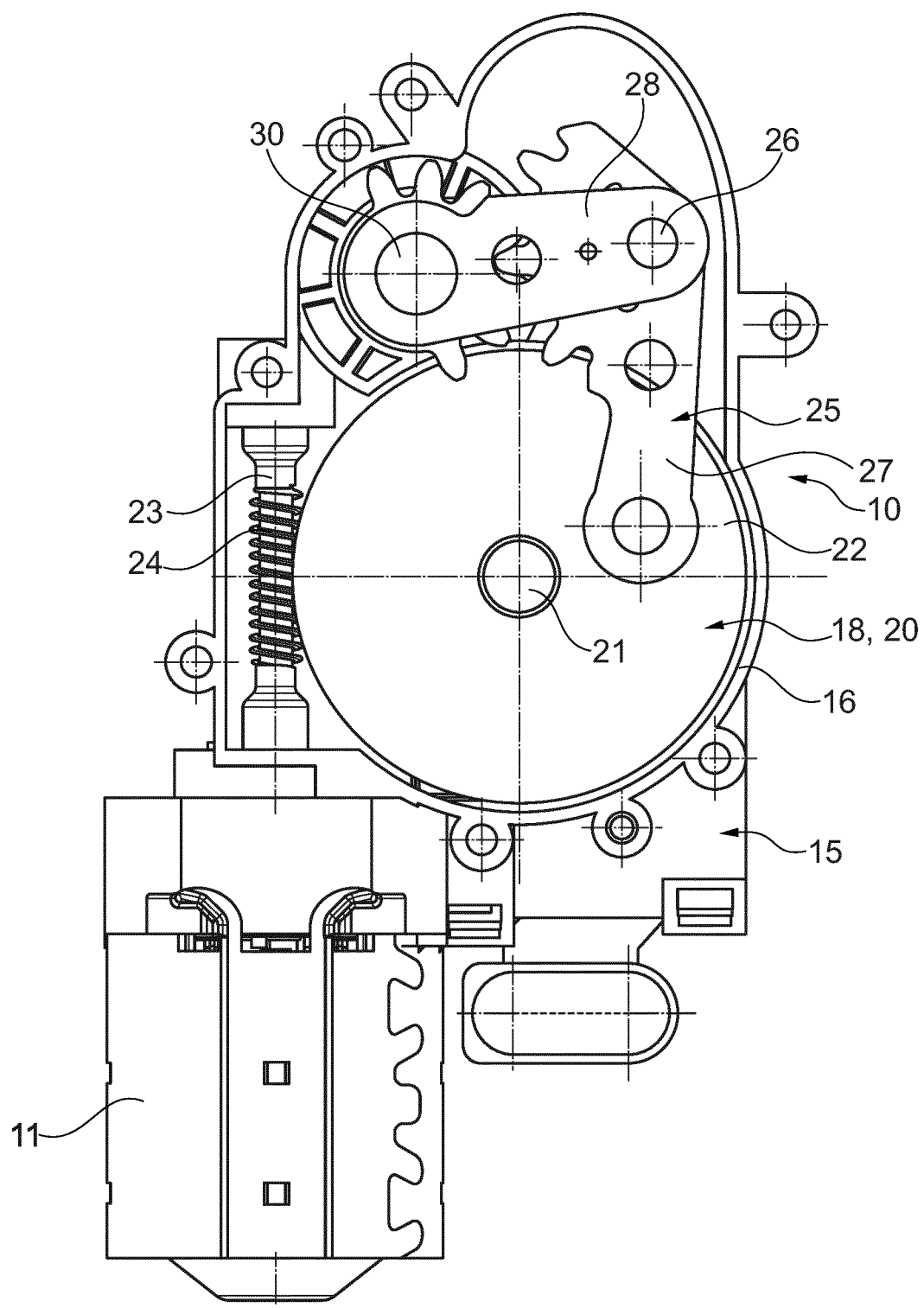

| | | | |
|---|---|---|---|
| 6,177,742 B1 | 1/2001 | Lauk et al. | |
| 2013/0154412 A1* | 6/2013 | Tokizaki | B60S 1/583 310/83 |
| 2013/0255408 A1* | 10/2013 | Tokizaki | B60S 1/08 74/42 |

FOREIGN PATENT DOCUMENTS

| | | | | |
|---|---|---|---|---|
| CN | 104246441 A | | 12/2014 | |
| CN | 104303403 A | | 1/2015 | |
| DE | 196 42 184 A1 | | 4/1998 | |
| DE | 102010052776 A1 | * | 5/2012 | ............. F16C 23/10 |
| DE | 102013212040 A1 | | 1/2015 | |
| EP | 1529702 A2 | * | 5/2005 | ........... H02K 7/1166 |
| EP | 1 837 979 A2 | | 9/2007 | |
| EP | 1610987 B1 | | 2/2013 | |
| FR | 2 970 222 A1 | | 7/2012 | |
| JP | H07-151140 A | | 6/1995 | |
| JP | 2011-259567 A | | 12/2011 | |

OTHER PUBLICATIONS

Machine Translation of DE 102013212040, obtained Jul. 24, 2020.*
International Search Report issued in PCT/EP2016/081402 dated Mar. 31, 2017 (2 pages).
Written Opinion of the International Searching Authority issued in PCT/EP2016/081402 dated Mar. 31, 2017 (5 pages).
First Office Action in corresponding Chinese Application No. 201680073349.5, dated Jul. 30, 2020 (12 pages).
Notification of Reason for Rejection in corresponding Japanese Application No. 2018-531545, dated Oct. 27, 2020 (19 pages).

* cited by examiner

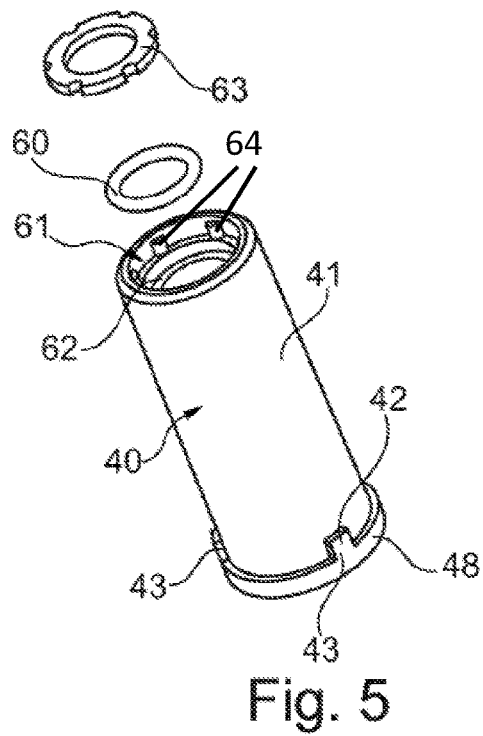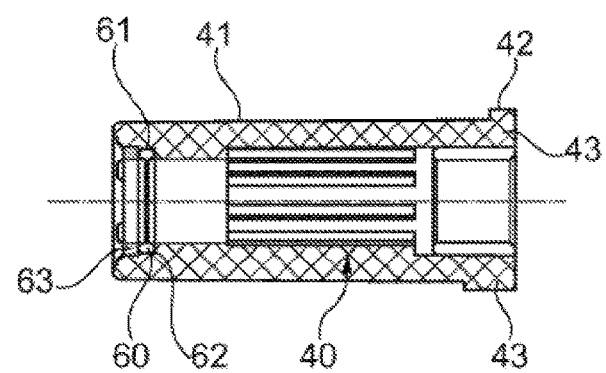
Fig. 5  Fig. 6
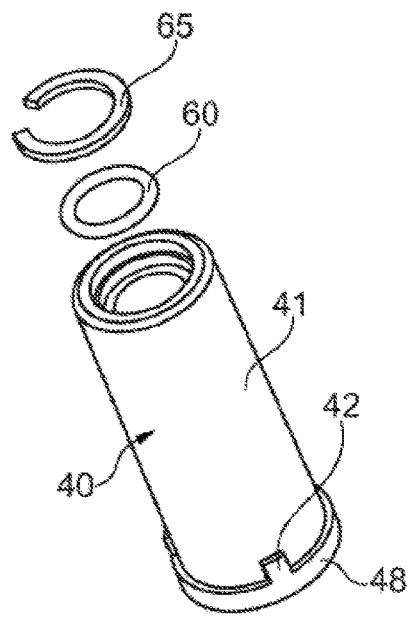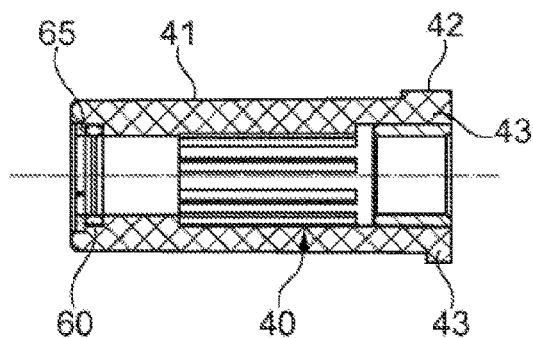
Fig. 7  Fig. 8

WIPER MOTOR AND METHOD FOR THE PRODUCTION OF A WIPER MOTOR

PRIOR ART

The invention relates to a wiper motor according to the precharacterizing clause of claim 1. The invention furthermore relates to a method for the production of a wiper motor according to the invention.

A wiper motor according to the precharacterizing clause of claim 1 is already known in practice. Such a wiper motor, which is in particular arranged in the rear region of a vehicle, has a gear housing consisting of metal, with an opening through which an output shaft of the wiper motor, which output shaft is connectable to a wiper arm, projects. The output shaft is mounted radially here in the region of the opening of the gear housing. It is essential here, that, in addition to the radial mounting in the region of the opening, the mounting has at the same time to be formed in such a manner that no moisture or particles can enter the interior space of the gear housing. In order to satisfy this function, use is made in practice of a sleeve-shaped element, which is composed of plastic and is designed as an injection moulded part, as the radial bearing element. For the mounting from the outside of the gear housing, said guide sleeve is pressed into the opening of the gear housing and is additionally connected to the gear housing by means of fastening means, such as screws, clip elements or the like. The known guide sleeve is therefore configured in a relatively complicated manner and the mounting is relatively complex.

DISCLOSURE OF THE INVENTION

Starting from the depicted prior art, the invention is based on the object of further developing a wiper motor according to the precharacterizing clause of claim 1 in such a manner that the sleeve-shaped element thereof can be configured in a particularly simple manner as a guide element for the output shaft, and no separate components are required for fastening the guide sleeve to the gear housing.

This object is achieved in the case of a wiper motor with the characterising features of claim 1.

The invention is based on the concept of configuring the sleeve-shaped element (guide sleeve) in such a manner that it has at least two different cross-sections, a first cross-section which is designed to be arranged in an axially displaceable manner within the (through) opening of the gear housing, and a second cross-section which, as a fixing section, is designed to be accommodated in an axially fixed manner within the opening of the gear housing. The sleeve-shaped element can therefore be guided into its axial end position with little effort, wherein, in the axial end position of the sleeve-shaped element, the latter is accommodated in an axially fixed manner by means of its second cross-section in the gear housing or opening thereof.

Advantageous developments of the wiper motor according to the invention are specified in the dependent claims. All combinations of at least two of the features disclosed in the claims, the description and/or the figures fall within the scope of the invention.

In order in particular to avoid tilting of the sleeve-shaped element within the opening of the housing or to be able to transmit relatively large tilting moments of the output shaft to the gear housing via the guide element, it is provided that the opening in the housing is preferably constructed as a cylindrical opening with a guide section extending in the longitudinal axis of the sleeve-shaped element for the first cross-section of the sleeve-shaped element, and that the sleeve-shaped element has at least substantially preferably a round outer cross-section over its entire axial length, except for in the region of the second cross-section. The round outer cross-section here has the advantage that the sleeve-shaped element can rotate as it is being inserted axially into the bore of the gear housing at least for as long as only the first cross-section is arranged in the region of the bore.

However, it is in principle alternatively also conceivable to provide the outer cross-section of the sleeve-shaped element or the opening in the through bore of the gear housing with a polygonal or elliptical cross-section. In this case, a defined angular position of the sleeve-shaped element with respect to the bore in the gear housing is provided in such a manner that the sleeve-shaped element can be introduced or fitted into the bore of the gear housing only in one specific angular position.

In order, firstly, to permit a good transmission of forces via the sleeve-shaped element into the bore of the gear housing and, secondly, to form a seal in the transition region between the opening in the gear housing and the outer cross-section of the sleeve-shaped element, it is furthermore of advantage if between the outer cross-section of the sleeve-shaped element and the inner cross-section of the opening of the gear housing at most a clearance fit is formed. A clearance fit is understood within the scope of the invention as meaning a fit between the cross-sections discussed, with which fit in particular the entry of media into the interior space of the gear housing is prevented.

For the axial fixing of the sleeve-shaped element in the bore of the gear housing, it is provided, in a structurally preferred refinement of the invention, that the opening in the gear housing has a fixing section for the second cross-section of the sleeve-shaped element, and that the fixing section has at least one recess projecting radially outwards, said recess cooperates in a form-fitting manner with at least one preferably mirror-inverted projection formed on the sleeve-shaped element. The recess in interaction with the projection therefore brings about at least the axial fixing of the sleeve-shaped element in the opening of the gear housing. Furthermore, in the case of a form-fitting interaction of the two elements mentioned, the sleeve-shaped element can also be arranged fixed in respect of angle of rotation in the opening of the gear housing.

In order to permit an axial introduction of the at least one projection into the at least one radially outwardly projecting recess of the fixing section, it is provided that the at least one recess in the opening originates from a face side of the opening.

In order, in particular in the interior space of the housing, to permit a flush or compact transition from the sleeve-shaped element into the region of the opening, it is provided that the second cross-section on the sleeve-shaped element with the at least one projection is formed on an axial end region of the sleeve-shaped element. In particular if the at least one recess for accommodating the at least one projection in the opening is formed on the inside of the gear housing, the sleeve-shaped element can thereby be introduced from the inside of the gear housing.

In order to seal the region in between the output shaft and the sleeve-shaped element and/or to prevent entry of media into the gear housing, it is provided that the sleeve-shaped element has at least one sealing element for the output shaft on a region projecting out from the gear housing, and that the at least one sealing element does not project beyond the outer cross-section of the sleeve-shaped element or is arranged within the cross-section of the sleeve-shaped element. This in particular also permits an arrangement of the sealing element that is protected from external and also mechanical effects.

In a specific structural refinement of such an arrangement of the sealing element, it is provided that the at least one sealing element is arranged in a mound formed on an inner wall of the bore of the sleeve-shaped element. A plurality of options are conceivable here for the axial securing or fastening of the sealing element in the mound: in a first refinement, it is provided that the at least one sealing element is axially secured in the mound by means of a fastening element. As a result, in particular a retrospective installation or an exchange of the sealing element is possible. However, in another structural refinement it can also be provided that the at least one sealing element is injected around by the material of the sleeve-shaped element. Such an embodiment has in particular the advantage of relatively low installation or production costs since the sealing element can be taken into consideration as early as during the manufacturing of the sleeve-shaped element or can be inserted therewith into the corresponding mould. As a result, installation of the sealing element with possible additional fastening elements is not required retrospectively.

As already explained above, the concept according to the invention of the sleeve-shaped element makes it possible in particular for the latter to be able to be mounted from the inside of the gear housing, in contrast to the prior art mentioned at the beginning. As a result, in particular no additional axial securing means are required. This is achieved in that the gear housing in the installed state of the sleeve-shaped element forms at least indirectly an axial stop in a direction opposed to a mounting direction of the sleeve-shaped element into the opening of the gear housing.

The invention also comprises a method for the production of a wiper motor according to the invention that is described to this extent. The method according to the invention is distinguished in that the introducing of the sleeve-shaped element into the opening of the gear housing takes place from a side forming an interior space of the gear housing.

Furthermore, the method according to the invention is distinguished in that through the introducing of the sleeve-shaped element into the opening of the gear housing in the axial end position of the sleeve-shaped element, a form-fitting connection is formed between the sleeve-shaped element and the gear housing. In other words, this means that the sleeve-shaped element is accommodated in an axially fixed manner in the gear housing solely by the mounting process and without additional elements or fastening parts.

Further advantages, features and details of the invention emerge from the description below of preferred exemplary embodiments and with reference to the drawing.

Figure 2:
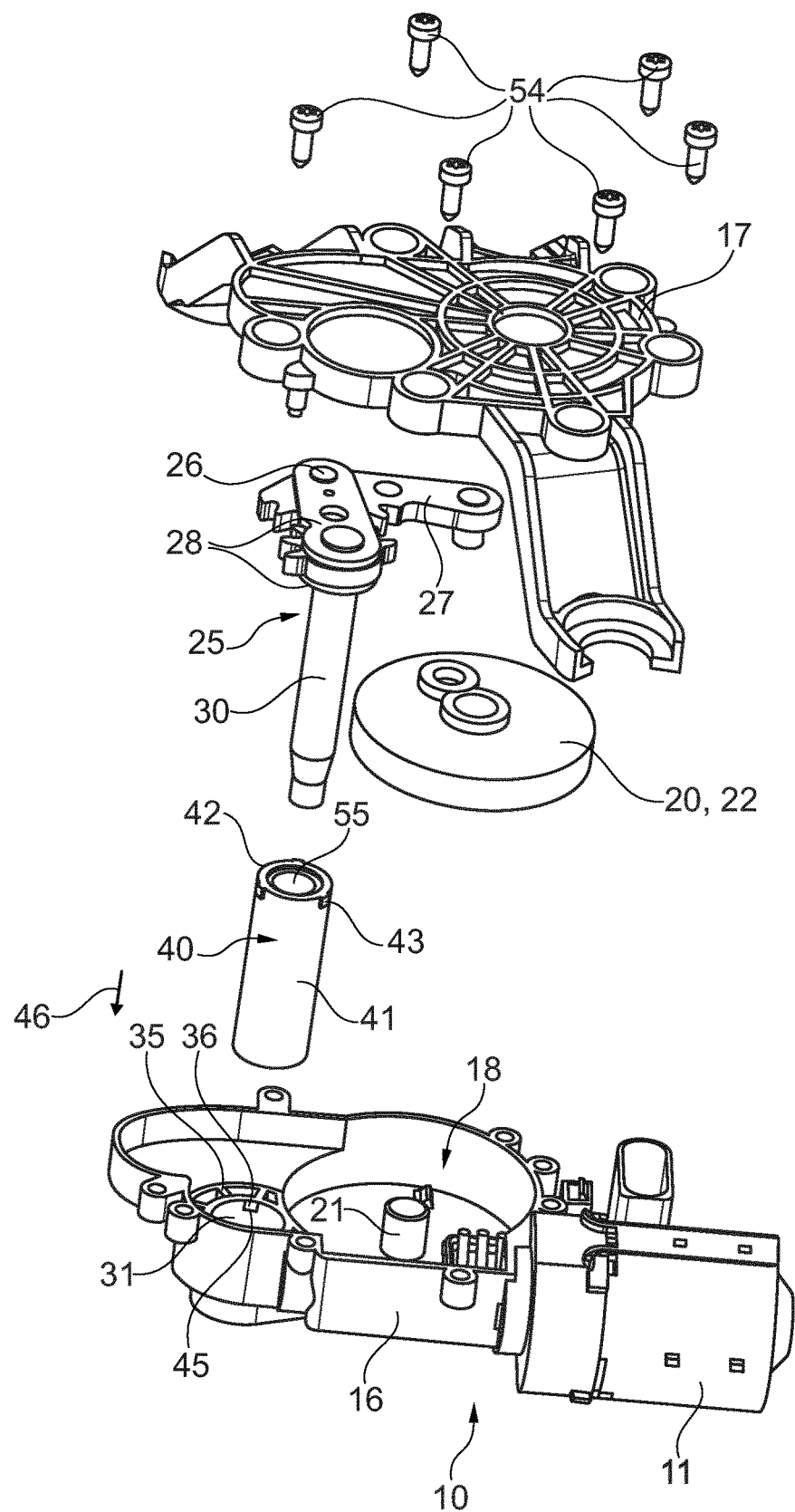
Figures 3, 4:
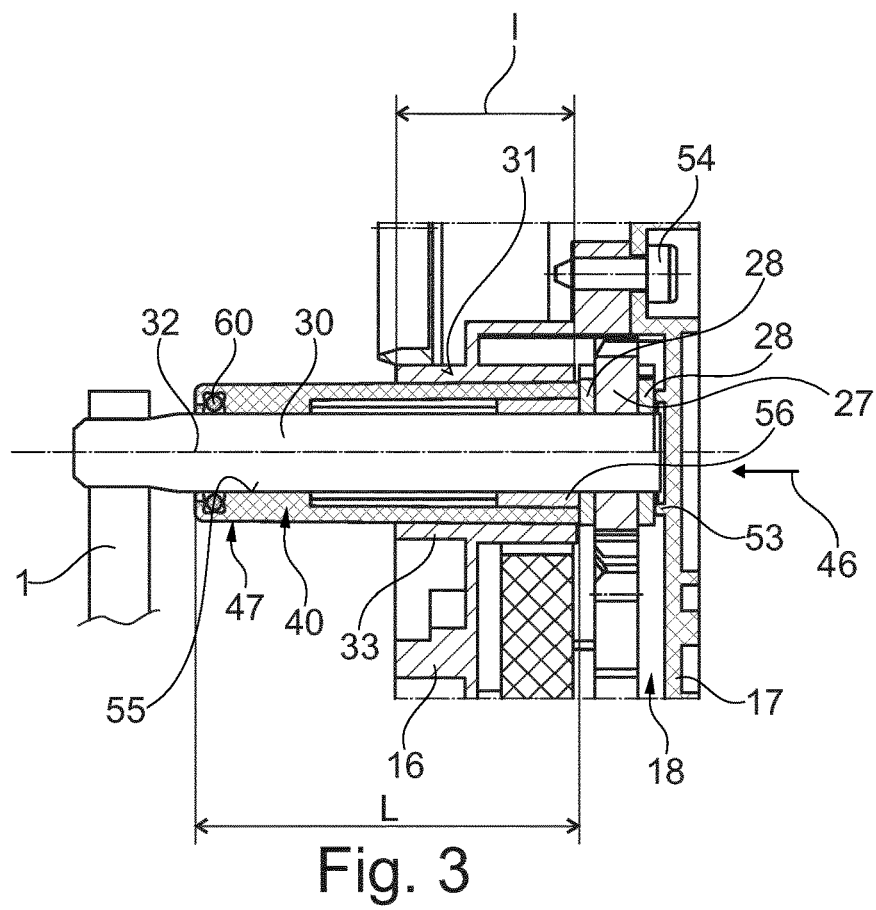

In said drawing:

FIG. 1 shows a wiper motor according to the invention in a simplified illustration with the gear housing open, FIG. 2 shows constituent parts of the wiper motor according to the invention in a perspective illustration, FIG. 3 a detail of the wiper motor in longitudinal section, FIG. 4 shows a detail from FIG. 3 in an enlarged illustration, likewise in longitudinal section, FIG. 5 shows a sleeve-shaped element in conjunction with a sealing element in a perspective arrangement, FIG. 6 shows a section through the sleeve-shaped element with the mounted sealing element, FIG. 7 shows a sealing concept modified in relation to FIG. 5, in a perspective view, and FIG. 8 shows the sleeve-shaped element according to FIG. 7 with the mounted sealing element, in a longitudinal section.

Identical elements or elements with the same function are provided with the same reference numbers in the figures.

The wiper motor 10 illustrated in particular in FIG. 1 serves in particular, but not restrictively, for driving a wiper arm 1, which is partially illustrated in FIG. 3 and to which a wiper blade (not illustrated) is fastened, wherein the wiper motor 10 is arranged in the rear region of a motor vehicle. The wiper motor 10 has an electric motor 11 which is flange-mounted on a gear housing 15 which is at least partially composed of metal. The gear housing 15 has at least a cup-shaped first housing element 16, the opening of which is closable by means of a housing cover which can be seen, for example, in FIGS. 2 and 3 and forms a second housing element 17. A gear 20 is accommodated in the interior space 18 of the gear housing 15. The gear 20 has, for example, a gearwheel 22 which is mounted rotatably in an axis 21 and on the outer circumference of which a toothing (not illustrated) is formed which meshes with a mating toothing 24 which is formed on a drive shaft 23 of the electric motor 11 and is arranged within the interior space 18 of the gear housing 15. At a distance from the axis 21, a lever mechanism 25 is coupled to the gearwheel 22. The lever mechanism 25 has a toothed segment 27 which is connected via a joint 26 to two levers 28 arranged on both sides of the toothed segment 27. An output shaft 30, the region of which that projects out of the gear housing 15 is connected to the wiper arm 1 for rotation therewith, is connected to the levers 28 for rotation therewith (FIG. 3).

The output shaft 30 penetrates the gear housing 15 in the region of the first cup-shaped housing element 16. For this purpose, the first housing element 16 has a through opening 31. As can be seen in particular with reference to an overall view of FIGS. 3 and 4, the through opening 31, which in particular has a round cross-section, has a guide section 33 extending in the direction of the longitudinal axis 32 of the output shaft 30, and a fixing section 34 on the side facing the interior space 18 of the gear housing 15. At least one recess 36 projecting radially outwards is formed in the region of the fixing section 34 which originates from an inner face side 35 of the first housing element 16. Outside the region of the at least one recess 36, the fixing section 34 has the same cross-section as the guide section 33.

The output shaft 30 is mounted radially in the through opening 31 by means of a sleeve-shaped element 40, which is configured as a plastics injection moulded part. As can be seen in particular with reference to FIGS. 3 to 8, the sleeve-shaped element 40 has at least two different (outer) cross-sections 41, 42. The first cross-section 41 is adapted to the inner cross-section of the guide section 33 in the through opening 31 in such a manner that the first cross-section 41 can be displaced longitudinally within the guide section 33. The second cross-section 42 of the sleeve-shaped element 40 has, by way of example, at least one projection 43, in the exemplary embodiment illustrated a plurality of projections 43 which are preferably arranged at identical angular distances from one another, project radially outwards and optionally have different cross-sections and cooperate in a form-fitting manner with the recesses 36 in the region of the fixing section 34 of the through opening 31. In this case, the fixing section 34 in cooperation with the projections 43 forms an axial stop 45 on the inner side of the gear housing 15 in such a manner that passage of the sleeve-shaped element 40 through the through opening 31 in the direction of the installation direction 46 of the element 40 from the inner side of the gear housing 15 is possible only as far as the position in which the projections 43 cooperate with the recesses 36.

In the exemplary embodiment illustrated, the sleeve-shaped element 40 has a length L which, for example, is twice as large as the length l of the through opening 31 in the gear housing 15. In the installed state of the sleeve-shaped element 40 in the gear housing 15 (FIG. 3), the sleeve-shaped element 40 projects with a region 47 out of the gear housing 15 or the through opening 31. Furthermore, on the side facing away from the region 47, the sleeve-shaped element 40 has an end-region 48, the outer diameter of which is adapted to the outer diameter of the second cross-section 42 of the sleeve-shaped element 40 in the region of the projections 43. In the installed state of the element 40, the end region 48 projects into the interior space 18 of the gear housing 15.

As can be seen in particular with reference to FIGS. 3 and 4, the toothed segment 27 is supported axially on both sides with respect to the sleeve-shaped element 40 and with respect to the second housing element 17 (housing cover) via the levers 28. Furthermore, on the side facing the one lever 28, the second housing element 17 has a radially encircling projection 53 which, when the second housing element 17 is mounted by means of fastening screws 54, brings about axial pressing or fixing of the output shaft 30 in the direction of the sleeve-shaped element 40.

Within an inner bore 55 of the sleeve-shaped element 40, which inner bore serves for the radial mounting of the output shaft 30, a bearing ring 56 is arranged on the side facing the one lever 28. The bearing ring 56 lies axially against the one lever 28. A sealing element 60 serving to seal the output shaft 30 with respect to the inner bore 55 is arranged on that side of the inner bore 55 which faces away from the bearing ring 56.

In the exemplary embodiment illustrated in FIG. 3, the sealing element 60 is taken into consideration as early as during the manufacturing of the sleeve-shaped element 40 or has been placed into the injection moulding dye for the sleeve-shaped element 40 in such a manner that the sealing element 60 is surrounded by the material of the sleeve-shaped element 40.

In the exemplary embodiment illustrated in FIGS. 5 and 6, the sealing element 60 (sealing ring) is arranged in a receptacle 61, which has different cross-sections, in the region of the inner wall of the sleeve-shaped element 40. The sealing element 60 lies against a step 62 of the inner bore 55 of the sleeve-shaped element 40 in the direction of the bearing ring 56. For the axial positioning of the sealing element 60 in the receptacle 61, said sealing element interacts with a holding disc 63 which, after the mounting thereof in the receptacle 61, is secured axially in the receptacle 61 by the deformation of caulking sections 64 in the region of the receptacle 61.

In the exemplary embodiment according to FIGS. 7 and 8, the sealing element 60 is axially positioned or fixed within the receptacle 61 of the sleeve-shaped element 40 by means of a snap ring 65.

The wiper motor 10 described to this extent can be modified in various ways without departing from the inventive concept. In particular, the shape and arrangement of the recesses 36 in the region of the through opening 31 and of the projections 43 on the sleeve-shaped element 40 can differ from the embodiments shown. The only matter of importance is that solely by means of a corresponding configuration of the sleeve-shaped element 40 and of the through opening 31 with different cross-sections 41, 42, firstly axial positioning or fixing of the sleeve-shaped element 40 in the gear housing 15 is made possible without additional, separate fastening elements, and, secondly, mounting of the sleeve-shaped element 40 from the interior space 18 of the gear housing 15 is possible.

REFERENCE SIGNS

1 Wiper arm
10 Wiper motor
11 Electric motor
15 Gear housing
16 First housing element
17 Second housing element
18 Interior space
20 Gear
21 Axis
22 Gearwheel
23 Drive shaft
24 Mating toothing
25 Lever mechanism
26 Joint
27 Toothed segment
28 Lever
30 Output shaft
31 Through opening
32 Longitudinal axis of the output shaft
33 Guide section
34 Fixing section
35 Inner end surface
36 Recess
40 Sleeve-shaped element
41 First cross-section
42 Second cross-section
43 Projection
45 Axial stop
46 Mounting direction
47 Region
48 End region
53 Radially encircling projection
54 Fastening screw
55 Inner bore
56 Bearing ring
60 Sealing element
61 Receptacle
62 Step
63 Holding disc
64 Caulking section
65 Snap ring
L Length of the sleeve-shaped element
l Length of the through opening

The invention claimed is:
1. A wiper motor, comprising:
a shaft for driving a wiper arm, wherein the shaft projects through an opening of a housing and the shaft is mounted in an at least substantially sleeve-shaped element,
wherein the sleeve-shaped element is fixed at least axially in the housing,
wherein the sleeve-shaped element has at least two different cross-sections, including a first cross-section which protrudes axially through the opening and out of the housing, a second cross-section which is axially fixed within said opening, the second cross-section defining a radially outermost surface of the sleeve-shaped element, the first cross-section having an outer surface defined by a constant outer diameter along an axial length of the first cross-section, and wherein the housing includes a guide section extending from an axial exterior surface of the housing away from the housing, the guide section supporting a portion of the first cross-section of the sleeve-shaped element;

wherein the sleeve-shaped element has at least one sealing element for the shaft, and wherein the at least one sealing element is located at the first cross-section within a radial interior of the first cross-section.

2. The wiper motor according to claim 1, wherein the opening in the housing is constructed as a cylindrical opening within the guide section extending along a longitudinal axis of the sleeve-shaped element.

3. The wiper motor according to claim 2, wherein a clearance fit is formed between the sleeve-shaped element and the opening of the housing.

4. The wiper motor according to claim 1, wherein the opening in the housing forms a fixing section for the second cross-section of the sleeve-shaped element, and wherein said fixing section has at least one recess projecting radially outwards, said at least one recess cooperates in a formfitting manner with at least one mirror-inverted projection formed on the second cross-section.

5. The wiper motor according to claim 4, wherein the at least one recess in the opening originates from a face side of the opening.

6. The wiper motor according to claim 5, wherein the second cross-section with the at least one projection on the sleeve-shaped element is formed on an axial end region of the sleeve-shaped element.

7. The wiper motor according to claim 1, wherein the sleeve-shaped element is formed as a plastic injection moulded part.

8. The wiper motor according to claim 1, wherein the at least one sealing element is arranged in a mount formed on an inner wall of the sleeve-shaped element.

9. The wiper motor according to claim 8, wherein the at least one sealing element is axially secured in the mount by a fastening element.

10. The wiper motor according to claim 8, wherein the at least one sealing element is injected around by the material of the sleeve-shaped element.

11. The wiper motor according to claim 1, wherein the housing in the installed state of the sleeve-shaped element forms at least indirectly an axial stop in a direction opposed to a mounting direction of the sleeve-shaped element into the opening of the housing.

12. The wiper motor according to claim 1, wherein the housing is a gear housing consisting of metal, and that the sleeve-shaped element is formed with a region projecting out from the housing so as to be arranged in an outer region of a vehicle.

* * * * *